(12) United States Patent
Winkelmann

(10) Patent No.: US 9,376,204 B2
(45) Date of Patent: Jun. 28, 2016

(54) HIGH-LIFT SYSTEM FOR A WING OF AN AIRCRAFT

(71) Applicant: AIRBUS OPERATIONS GMBH, Hamburg (DE)

(72) Inventor: Christoph Winkelmann, Buchholz (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 276 days.

(21) Appl. No.: 13/855,995

(22) Filed: Apr. 3, 2013

(65) Prior Publication Data

US 2013/0277498 A1  Oct. 24, 2013

Related U.S. Application Data

(63) Continuation of application No. PCT/EP2011/067422, filed on Oct. 5, 2011.

(60) Provisional application No. 61/389,976, filed on Oct. 5, 2010.

(30) Foreign Application Priority Data

Oct. 5, 2010 (DE) .......................... 10 2010 047 540

(51) Int. Cl.
- *B64C 5/10* (2006.01)
- *B64C 13/34* (2006.01)
- *B64D 45/00* (2006.01)

(52) U.S. Cl.
CPC ............ *B64C 13/34* (2013.01); *B64D 45/0005* (2013.01); *B64D 2045/001* (2013.01); *Y02T 50/44* (2013.01)

(58) Field of Classification Search
None
See application file for complete search history.

(56) References Cited

U.S. PATENT DOCUMENTS

| | | | | |
|---|---|---|---|---|
| 3,642,209 A | * | 2/1972 | Stahl | 239/265.19 |
| 3,691,911 A | * | 9/1972 | Visser | 91/171 |
| 4,441,675 A | * | 4/1984 | Boehringer et al. | 244/213 |
| 4,578,993 A | * | 4/1986 | Burandt | 73/162 |
| 4,721,016 A | * | 1/1988 | Burandt | 475/342 |

(Continued)

OTHER PUBLICATIONS

German Patent and Trade Mark Office, German Office Action for German Patent Application No. 10 2010 047 540.8, mailed Feb. 25, 2014.

(Continued)

*Primary Examiner* — Medhat Badawi

(74) *Attorney, Agent, or Firm* — Ingrassia Fisher & Lorenz, P.C.

(57) ABSTRACT

A high-lift system for a wing of an aircraft is provided. The high-lift system includes movably held high-lift flaps, at least one drive unit, at least one transmission shaft connected to the drive unit, and several actuator devices, distributed on the transmission shaft and connected to the high-lift flaps, for moving the high-lift flaps. The actuator devices each comprise a driven element and a torque limiting means. In one example, the driven elements of two adjacent actuator devices are interconnected in a non-rotational manner with the use of a separate torque transmitting means. If one actuator device is blocked, for example as a result of a defective tooth arrangement or some other defect, the torque to be produced by the intact actuator device increases and triggers its torque limiting means. This ensures synchronous operation and in the case of malfunction prevents damage to or detachment of a flap.

15 Claims, 4 Drawing Sheets

(56) References Cited

U.S. PATENT DOCUMENTS

| | | | |
|---|---|---|---|
| 4,779,822 A * | 10/1988 | Burandt et al. | 244/99.9 |
| 5,074,495 A * | 12/1991 | Raymond | 244/78.1 |
| 5,082,208 A * | 1/1992 | Matich | 244/78.1 |
| 5,680,124 A * | 10/1997 | Bedell et al. | 340/945 |
| 5,686,907 A * | 11/1997 | Bedell et al. | 340/945 |
| 5,743,490 A * | 4/1998 | Gillingham et al. | 244/99.9 |
| 5,875,998 A * | 3/1999 | Gleine et al. | 244/195 |
| 6,003,395 A * | 12/1999 | Rogg et al. | 74/335 |
| 6,076,767 A * | 6/2000 | Farley et al. | 244/78.1 |
| 6,257,528 B1 * | 7/2001 | Brislawn | 244/211 |
| 6,386,482 B1 * | 5/2002 | Capewell | 244/129.1 |
| 6,443,034 B1 * | 9/2002 | Capewell et al. | 74/665 GA |
| 6,554,734 B1 * | 4/2003 | Maydew | 475/248 |
| 6,625,982 B2 * | 9/2003 | Van Den Bossche et al. | 60/403 |
| 6,651,930 B1 * | 11/2003 | Gautier et al. | 244/78.1 |
| 6,799,739 B1 * | 10/2004 | Jones | 244/10 |
| 7,048,234 B2 * | 5/2006 | Recksiek et al. | 244/213 |
| 7,331,548 B1 * | 2/2008 | Simkulet | 244/225 |
| 7,556,224 B2 * | 7/2009 | Johnson et al. | 244/175 |
| 8,074,937 B2 | 12/2011 | Carl et al. | |
| 8,191,821 B2 * | 6/2012 | Knight | 244/51 |
| 8,336,817 B2 * | 12/2012 | Flatt | 244/99.9 |
| 8,336,818 B2 * | 12/2012 | Flatt | 244/99.9 |
| 8,567,726 B2 * | 10/2013 | Lacy et al. | 244/211 |
| 8,760,313 B2 * | 6/2014 | Bernhart | 340/691.6 |
| 2004/0200928 A1 | 10/2004 | Degenholtz et al. | |
| 2004/0245386 A1 * | 12/2004 | Huynh | 244/75 R |
| 2005/0151028 A1 * | 7/2005 | Pohl et al. | 244/213 |
| 2006/0043242 A1 * | 3/2006 | Benson | 244/175 |
| 2007/0080261 A1 * | 4/2007 | Neumann et al. | 244/194 |
| 2009/0212977 A1 | 8/2009 | Pohl | |
| 2010/0044518 A1 * | 2/2010 | Fleddermann et al. | 244/194 |
| 2010/0282899 A1 * | 11/2010 | Heintjes | 244/99.5 |
| 2011/0255968 A1 * | 10/2011 | Recksiek | 416/23 |
| 2011/0290945 A1 | 12/2011 | Peirce | |
| 2012/0018578 A1 * | 1/2012 | Polcuch | 244/99.2 |
| 2013/0330207 A1 * | 12/2013 | Nakajima et al. | 417/44.1 |

OTHER PUBLICATIONS

International Searching Authority, International Search Report dated Jan. 3, 2012 for International Application No. PCT/EP2011/067422.

State Intellectual Property Office of the Peoples' Republic of China, Office Action in Chinese Patent Application No. 201180048363.7, mailed Aug. 18, 2014.

International Searching Authority, Written Opinion dated Jan. 3, 2012 for International Application No. PCT/EP2011/067422.

State Intellectual Property Office of the Peoples' Republic of China, Office Action for Chinese Patent Application No. 201180048363.7 mailed May 11, 2015.

* cited by examiner

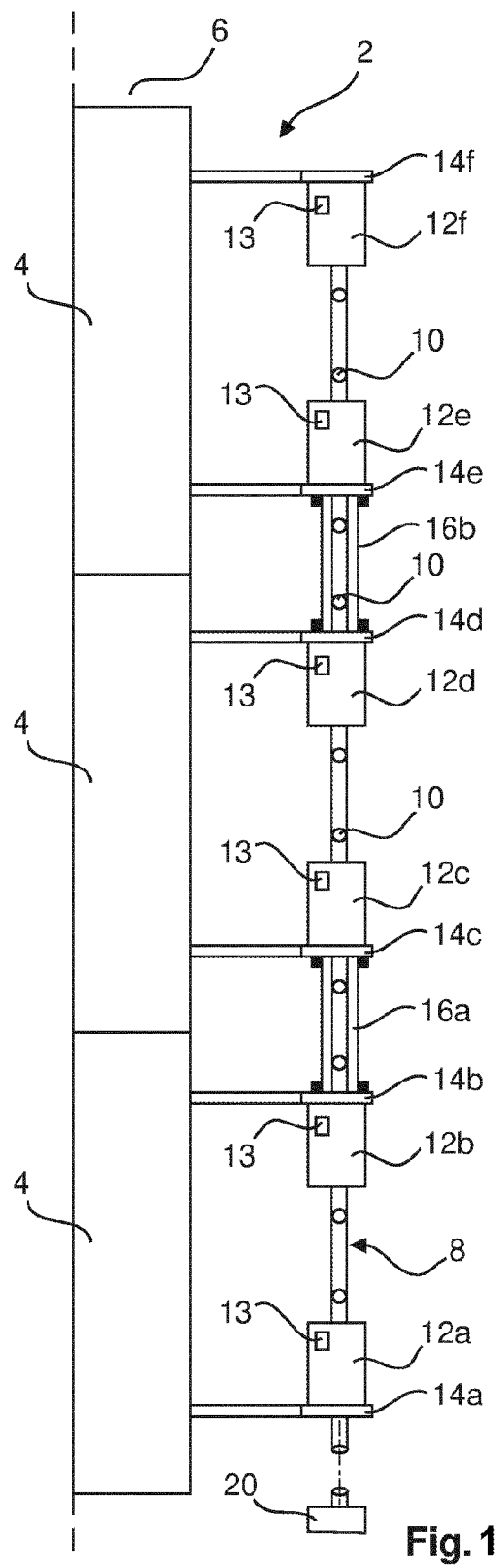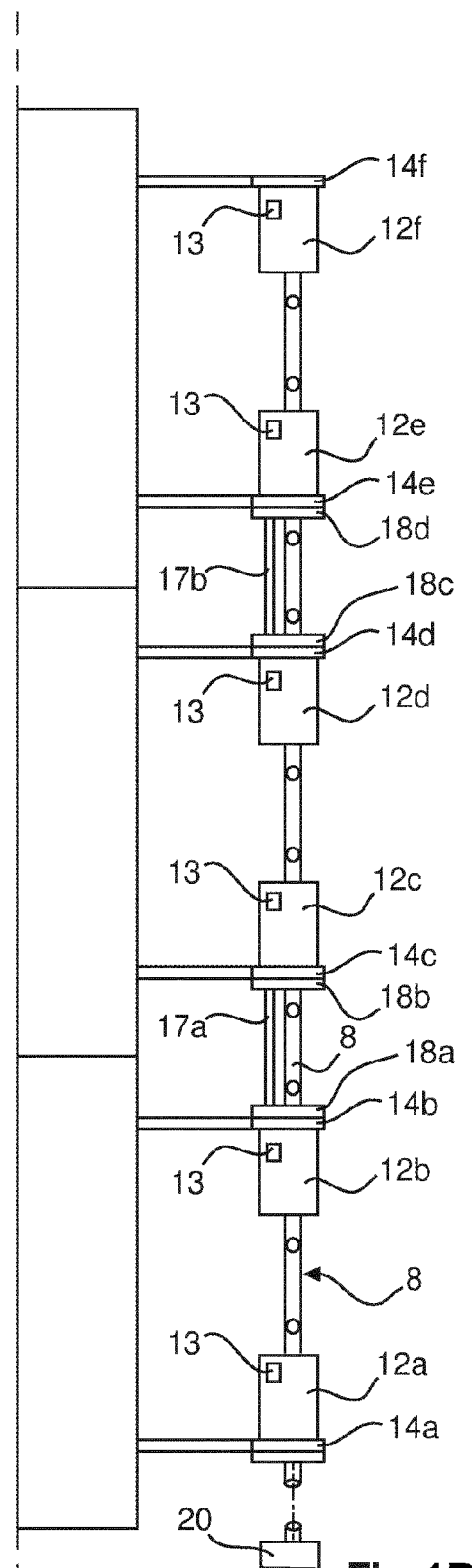

HIGH-LIFT SYSTEM FOR A WING OF AN AIRCRAFT

CROSS REFERENCE TO RELATED APPLICATIONS

This is a continuation of International Application No. PCT/EP2011/067422, filed Oct. 5, 2011, which application claims priority to U.S. Provisional Application No. 61/389,976, filed Oct. 5, 2010, and to German Application No. 10 2010 047 540.8, filed Oct. 5, 2010, which are incorporated herein by reference in their entirety.

TECHNICAL FIELD

The technical field relates to a high-lift system for a wing of an aircraft with movably held high-lift flaps, with at least one drive unit and with at least one transmission shaft connected to the drive unit, as well as with several actuator devices for moving the high-lift flaps, which actuator devices are distributed on the transmission shaft and are connected to the high-lift flaps. The technical field further relates to the use of a separate torque transmitting means between two driven elements of adjacent actuator devices for the mechanical synchronization control of high-lift flaps.

BACKGROUND

The normal, and presently widely used, high-lift systems for wings of civil and military aircraft comprise a multitude of high-lift flaps that are movably held on the wing and are driven by way of a transmission shaft train that extends into the wing, and by actuator devices arranged on said transmission shaft train. The embodiment comprising two actuator devices (also known as a "drive station") for each high-lift flap to be moved is usual. The actuator devices are normally designed as linear spindle drives; with a corresponding design and redundant arrangement they can provide very high reliability. If nonetheless components of actuator devices or of the mechanical connections between actuator devices and high-lift flaps develop a malfunction during operation of the aircraft, blocking of an actuator device may occur. This subsequently results in blocking of the corresponding side of the high-lift flap to be moved, while the actuator device connected to the other side attempts to keep the other side moving. As a result of this the high-lift flap is subjected to torque until the torque produced by the still-intact actuator device is high enough to trigger a torque limiting means integrated in the actuator device, thus stopping operation of the central drive unit. Damage to, or detachment of, the high-lift flap can only be prevented by a corresponding damage-tolerant design, accompanied by the weight of the high-lift flap which consequently is not optimal.

A (high-lift) flap with devices for malfunction detection of the flap is disclosed in the printed publications EP 1 957 364 B1 and US 20090212977 A1, wherein the flap is connected to an evaluation device in order to switch off a central drive unit. The flap comprises a transmission element, for example a tube or a bar, arranged along the wingspan, wherein the transmission element carries a rigidly connected measuring arm in order to form a reference point that is connected to a sensor for detecting asymmetry or twisting of the flap.

In an alternative system a linear, flexurally soft sensor element is fed through high-lift flaps that are arranged side by side, on one end is affixed to a wing structure, and on the other end is attached to a linear sensor so that when the high-lift flaps are in an oblique position relative to each other one end of the sensor element and thus the linear sensor is pulled, which by means of a corresponding evaluation unit results in a signal that interrupts movement of the central drive unit.

In addition, other objects, desirable features and characteristics will become apparent from the subsequent summary and detailed description, and the appended claims, taken in conjunction with the accompanying drawings and this background.

SUMMARY

In the course of increasingly stringent approval regulations or of requirements for improved reliability in future aircraft, high-lift systems without synchronization control or other suitable means for detecting disturbance of synchronous operation are practically no longer a preferred approach. Sensor-based monitoring of synchronous operation or of symmetrical movement of high-lift flaps requires a large number of sensors, associated evaluation units, associated electrical lines and, in particular, locations for accommodation that are safe against freezing up, and the like. While such a concept of a high-lift system would be associated with advantages relating to monitoring, it is nevertheless costly and comparatively complex. In contrast to this, a high-lift system with a flexurally soft linear sensor element along high-lift flaps that are arranged side by side is mechanically quite simple, but such a device is unlikely to be suitable for retrofitting in already existing high-lift systems without the need for replacing all the high-lift flaps and parts of the wing.

Accordingly, the present disclosure provides a high-lift system that is mechanically as simple as possible in design, in which system the lowest possible number of sensors are used, and which system can generally be obtained with only slight modifications of an already existing high-lift system.

A high-lift system according to the present disclosure for a wing of an aircraft comprises movably held high-lift flaps, at least one drive unit, at least one transmission shaft connected to the drive unit and several actuator devices, distributed on the transmission shaft and connected to the high-lift flaps, for moving the high-lift flaps. The actuator devices per se each comprise a driven element and a torque limiting means. According to the present disclosure the driven elements of two adjacent actuator devices are interconnected in a non-rotational manner with the use of a separate torque transmitting means.

A high-lift flap in the sense of the present disclosure can either be a flap, i.e. arranged on the trailing edge of the wing, or a slat, i.e. arranged on the leading edge of a wing. Flaps are known in the form of single-gap flaps or double-gap flaps, while slats are predominantly used as single-gap slats. Both types of flaps normally at the same time undergo a translatory movement and a rotary movement. In the state of the art the drive of such high-lift flaps with transmission shafts has been proven, which transmission shafts extend into both wing halves in order to transmit into the wing halves torque that is generated by a central drive unit. In this arrangement the transmission shaft is rotatably held on several flap support stations, wherein, due to the shape of the wing halves and the position of a central drive unit, changes in direction are evened out by means of shaft articulation arrangements. Generally, for each high-lift flap two actuator devices are provided which slow down rotation of the transmission shaft by way of a transmission gear arrangement to a driven element, wherein the driven element is designed to move the respective high-lift flap, or one side of the respective high-lift flap, by way of a guide element or the like. For mechanical safeguarding, each actuator device comprises a torque limiting means so that if one actuator device is blocked, for example as a result of a defective tooth arrangement or some other defect, an increase in torque above a predetermined value results in the central drive unit being switched off.

Affixing a separate torque transmitting means to the driven elements of two adjacent actuator devices practically results in the creation of purely mechanical synchronization monitoring. The transmission shaft rotates at each position within the wing halves at practically the same speed so that identically designed actuator devices also result in identical rotary speed at the respective driven elements. If the separate torque transmitting means is arranged between two adjacent driven elements and is connected in a non-rotational manner to these two driven elements, with intact actuator devices and an intact transmission shaft the torque transmitting means simply rotates with the driven elements. No torque to be transmitted from one driven element to the other arises. If in one of the two actuator devices a defect occurs that results in a lockage, as a consequence one of the two adjacent driven elements comes to a standstill. Consequently, one end of the torque transmitting means is still being driven by the driven element of the functional actuator device, but the other end is firmly held. This results in a differential torque on the torque transmitting means, which torque acts counter to the movement of the driven element of the functional actuator device. The torque limiting means of the functional actuator device is thus subjected to significantly higher torque than is usual for normal operation so that if a predetermined limiting torque has been exceeded, the torque limiting means is triggered and the central drive unit receives a switch-off signal or the like.

Such a design of the high-lift system according to the present disclosure provides an advantage in that at first the high-lift flap that is connected to a defective actuator device experiences practically no mechanical load as a result of a blocking actuator device, which could prevent damage to or detachment of the high-lift flap concerned. At the same time the design of the torque transmitting means is mechanically so simple that no significant additional costs arise from its integration, and the design is clearly superior to sensor-based monitoring of synchronization control or control based on cases of asymmetry. Furthermore, retrofitting in existing high-lift systems is very simple because it is merely necessary for the separate torque transmitting means to be used between the driven elements of two adjacent actuator devices, for which purpose in an ideal case no far-reaching design changes are required. In addition the integration expenditure is significantly lower, and there are no electronic components arranged downstream, so that the additional weight resulting from the separate torque transmitting means, too, is kept within manageable limits.

According to one embodiment of the present disclosure, the torque transmitting means is a torsion shaft which for connection to driven elements could, for example, on two ends comprise a corresponding flange or a non-positively locking, positively locking or integral shaft-hub connection so that through this very simple integration to driven elements of two adjacent actuator devices could be carried out. For example steel, a high-strength aluminum alloy, a fiber composite material or titanium could be a suitable material for such torsion shafts, so that an optimum shaft diameter can be selected and by means of an advantageous material density the weight of the torque transmitting means can additionally be kept within narrow limits.

According to one embodiment, the torsion shaft is a hollow shaft through which the transmission shaft is fed. This provides several advantages, for example with a relatively thin wall, with a large external diameter of the torsion shaft it is possible to achieve only very small additional weight when compared to high-lift systems without synchronization monitoring, wherein at the same time because of the through-arrangement of the transmission shaft only very little additional installation space is required.

According to one embodiment, a torsion shaft could be used that extends parallel to the torsion shaft and is connected to the adjacent driven elements by means of an offset gear arrangement. Such a design provides an advantage as a result of the possible weight reduction, because for reducing the torque on the torque shafts and thus for reducing the necessary strength it is possible to increase the rotary speed.

According to one embodiment, high-lift flaps of a wing half are divided into two or more groups with different actuating speeds in which actuator devices of one group comprise a transmission ratio that differs from that of actuator devices of another group. Consequently it makes sense to only interconnect driven elements within a common group of high-lift flaps. In particular in the case of larger wings this is associated with an advantage in that outer and inner high-lift flaps can be extended at different speeds and with different adjustment paths without having to do entirely without the advantages of mechanical monitoring, according to the present disclosure, of synchronous operation.

According to one embodiment of the present disclosure, torsion shafts are used at the junctions between two groups of high-lift flaps, which torsion shafts extend parallel to the transmission shaft and are connected by way of offset gear arrangements to the adjacent driven elements, wherein the offset gear arrangements have different transmission ratios in order to take into account the different actuating speeds of the high-lift flaps of the adjacent groups. The term "offset gear arrangement" defines a gear arrangement with a transmission input and a transmission output, wherein the axes of the transmission input and of the transmission output are not aligned with each other, in other words an offset exists. This makes it possible to operate a torsion shaft that is not arranged coaxially to the transmission shaft. The mechanically simplest variant of an offset gear arrangement could be implemented in the form of a spur gear arrangement with two or more spur gears with rotary axes that are parallel to each other, wherein for optimizing the weight the diameter of the pinions should be selected so as to be as small as possible. As an alternative to this, in order to bridge larger distances the use of belt drives or chain drives may suggest itself, wherein in such an arrangement, as a result of the use of an additional machine element in the form of a belt or a chain, the reliability of the offset gear arrangement might decrease, and attention would have to be paid to corresponding dimensioning or redundancy.

In one embodiment, torsion shafts in the form of hollow shafts are combined with torsion shafts with offset gear arrangements, wherein the torsion shafts with offset gear arrangements are generally arranged on the junctions between groups of high-lift flaps, while torsion shafts designed as hollow shafts are arranged within the individual groups of high-lift flaps.

In one embodiment, synchronous operation between the groups of high-lift flaps can be monitored by targeted incorporation of play in the connection of the torsion shaft, which is designed as a hollow shaft, at the output of the actuator devices, in order to compensate for the difference in synchronous operation between the driven sides of adjacent actuator devices with different actuating speeds. As a result of the play there is a tendency to reduce the sensitivity which is generally to be used only if the system switches off in the case of differences in synchronous operation, which differences do not exceed a value of up to about 6° at the high-lift flap.

The present disclosure also provides for the use of a torque transmitting means for mechanically monitoring the synchronous operation of adjacent actuator devices of a high-lift system of an aircraft. In this context the term "monitoring" refers to mechanically activating a torque limiting means if there is a difference in the rotary speed.

Furthermore, an aircraft comprising a high-lift system according to the present disclosure is provided.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1A and FIG. 1B show a diagrammatic block-based view of a high-lift system according to the present disclosure in an embodiment comprising hollow shafts and in a section comprising torsion shafts with an offset gear arrangement.

DETAILED DESCRIPTION

Figure 2:
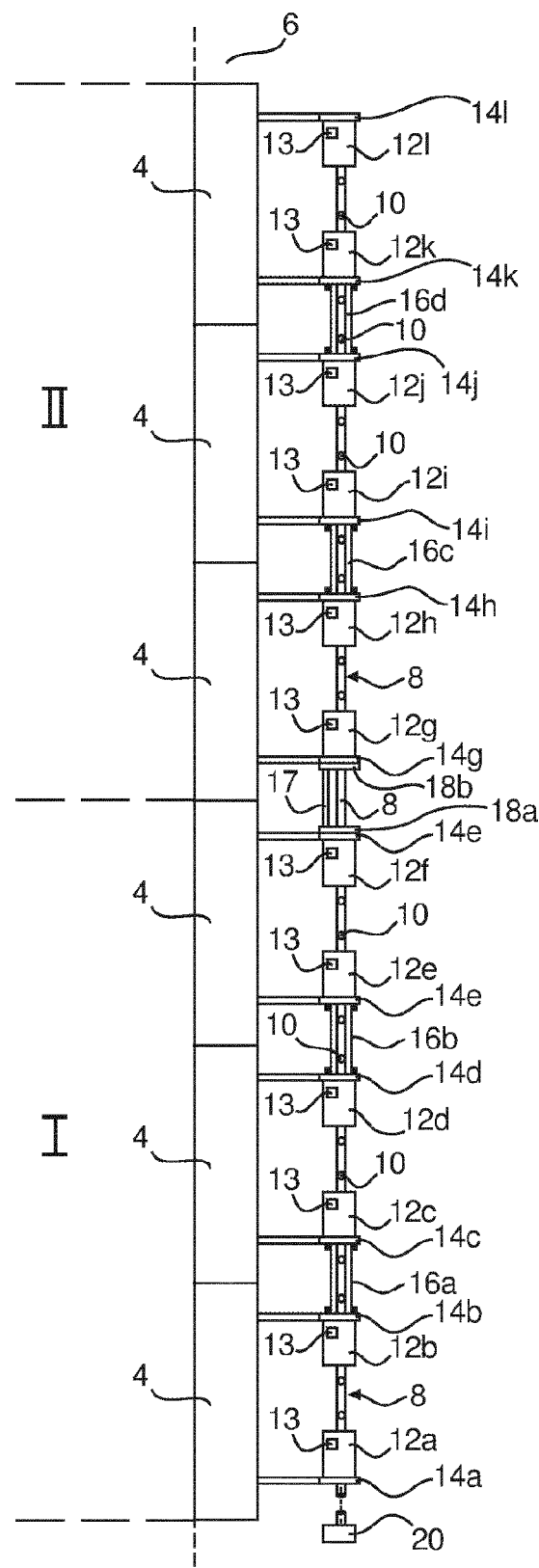
FIG. 2 shows a high-lift system according to the present disclosure with several groups of high-lift flaps, torsion shafts designed as hollow shafts, and torsion shafts with offset gear arrangements between the groups.
Figure 3:
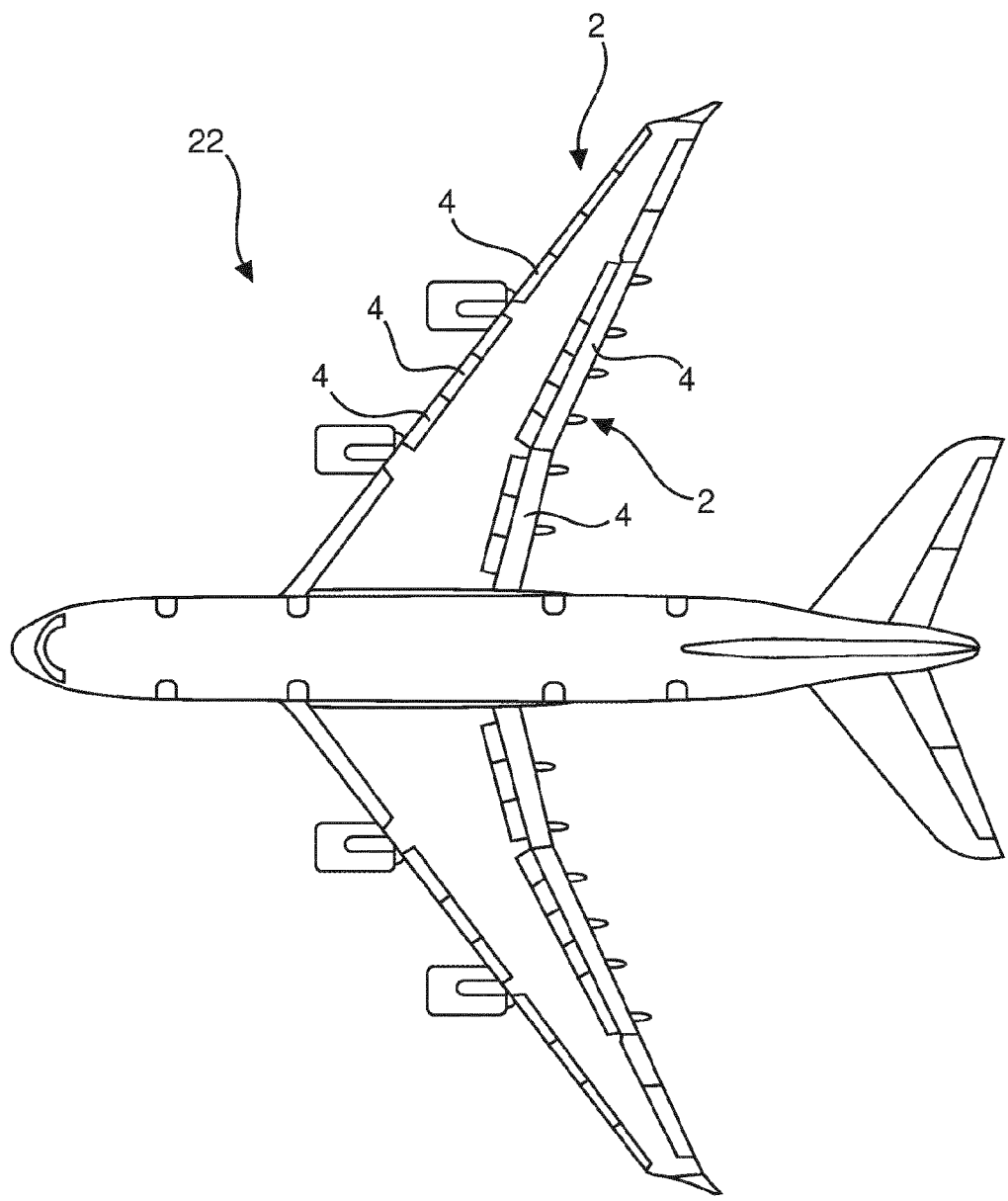
FIG. 3 shows an aircraft comprising at least one high-lift system according to the present disclosure.

The following detailed description is merely exemplary in nature and is not intended to limit the present disclosure or the application and uses of the present disclosure. Furthermore, there is no intention to be bound by any theory presented in the preceding background or the following detailed description.

FIG. 1A shows a high-lift system 2 according to the present disclosure with, as an example, three high-lift flaps 4a, 4b and 4c that are movably held on one half of a wing 6. Within the wing 6 a transmission shaft 8 extends that is connected to a central drive unit 20 which is only shown diagrammatically in the illustration. The transmission shaft 8 comprises a number of shaft joints 10 that are used to change direction in the wing 6, which normally does not extend in a completely straight line, in the direction of extension. Several actuator devices 12a, 12b, 12c, 12d, 12e and 12f are arranged on the transmission shaft 8, which actuator devices 12a, 12b, 12c, 12d, 12e and 12f from rotation of the transmission shaft 8 cause rotation of an associated driven element 14a, 14b, 14c, 14d, 14e and 14f with clearly reduced speed. To protect against mechanical overload, each of the actuator devices 12a-12f comprises a torque limiting means 13 which when a limiting torque is exceeded generally causes the drive unit 20 to cease rotation so that all the high-lift flaps 20 remain in their position at that time. For example a pinion or a shaft end could be considered a driven element on which a leer with a drive rod is attached.

As an example, the transmission shaft 8 could be operated at a rotary speed of about 500 to about 1200 revolutions per minute, while the actuator devices 12a-12e as a result of a transmission ratio of, for example, about 1:200 cause a significantly lower rotary speed on the respective driven element 14a-14e. The respective driven element 14a-14e or an actuator attached to it, for example the pinion of a rack-and-pinion drive, is, for example, connected to a side of a flap 4 so that during rotation of the driven element 14a-14e movement of the respective side of the corresponding flap 4 results.

Torsion shafts 16a and 16b are arranged between two adjacent actuator devices 12b and 12c or 12d and 12e, each, which torsion shafts 16a and 16b are connected in a non-rotational manner to the respective driven element 14b and 14c or 14d and 14e. Thus if a driven element 14b-14e rotates on one side of the torsion shaft 16a or 16b, this torsion shaft 16a or 16b rotates as well as soon as the adjacent actuator device 12b-12e also carries out this rotation. If the rotational speeds differ, one of the two actuator devices 12b-12e is braked in such a manner that with a suitable setting of the respective torque limiting means 13 a preset torque is exceeded and consequently the torque limiting means interrupts operation of the central drive unit 20.

The torsion shaft 16a or 16b is designed as a hollow shaft through which the transmission shaft 8 leads. The external diameter of the torsion shaft 16a, 16b can be selected depending on the diameter of the transmission shaft 16a, 16b, wherein with an increasing external diameter the thickness of the wall of the torsion shaft 16a, 16b can be reduced. If at the same time a material with relatively low density is used, for example a high-strength aluminum alloy or for example titanium, very little additional weight can be achieved.

As an alternative, according to FIG. 1B, a torsion shaft 17a and 17b could be used that extends parallel to and at a distance from the transmission shaft 8. In this case the connection between associated driven elements 14b, 14c, 14d and 14e and the torsion shafts 17a and 17b takes place with the use of offset gear arrangements 18a, 18b, 18c and 18d that can also comprise a gearing arrangement. With the use of a high transmission ratio the diameter and the weight of the torsion shaft 17a and 17b can be reduced because the transmitting moment is reduced while at the same time the rotational speed is increased.

FIG. 2 shows an embodiment in which a total of six flaps 4 are arranged that are divided into two groups I and II and that are driven by a total of twelve actuator devices 12a-12l. The special feature of this high-lift system includes a first group with actuator devices 12a-12f causing an actuating speed of the flaps 4 which differs from the speed of the remaining actuator devices 12g-12l of a second group of flaps 4.

Between the actuator devices 12a-12f or 12g-12l torsion shafts 16a and 16b or 16c and 16d that are designed as hollow shafts can be used analogously to the illustration shown in FIG. 1B in order to achieve mechanical monitoring of synchronous operation within group I or II. However, with a different actuating speed of the flaps of the two groups I and II this is not possible without creating corresponding equalization of the rotational speeds. In principle it is imaginable to use an elaborate planetary gear arrangement through which the torsion shaft 8 could extend. However, such a design would not be very space-saving and would furthermore be quite cost intensive.

The targeted incorporation of play in the connection of the hollow shaft at the output of the actuator devices is another option for monitoring synchronous operation between the groups. This is used to absorb the difference in synchronous operation between the drives of adjacent actuator devices with different actuating speeds. However, this results in a reduction in sensitivity and is only possible if the system switches off in the case of differences in synchronous operation, which differences on the actuating surface do not exceed a value of up to about 6°.

A border between the first group I and the second group II of high-lift flaps 4 could be, for example, situated between the actuator devices 12f and 12g. In this case the use of a torsion shaft 17a that extends parallel to the transmission shaft 8 suggests itself, which is connected to the drive elements 14f and 14g by way of two offset gear arrangements 18a and 18b. With the correct selection of the different transmission ratios of the offset gear arrangements 18a and 18b the different actuating speeds in the two groups I and II can be taken into account. In the case of rotary speeds of the driven elements 14f and 14g, which rotary speeds differ from the intended rotary speeds, in this embodiment, too, torque on one of the driven elements 14f or 14g, which torque acts against rotation, will arise in the case of a defect in one of the two actuator devices 12f or 12g, as a result of which the respective torque limiting means 13 is triggered. With the concept of the present disclosure of the offset torsion shaft, mechanical synchronization monitoring can in this way also be carried out between high-lift flaps 4 that use different actuating speeds.

Figure 4A:
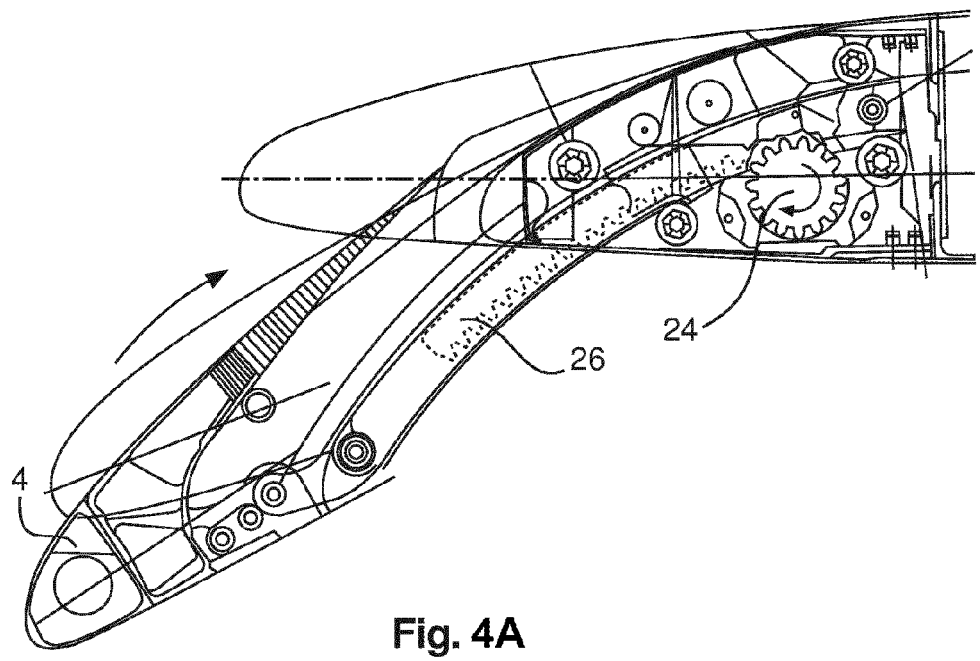
FIG. 4A and FIG. 4B show a detailed illustration of possible driven elements on a high-lift system.
Figure 4B:
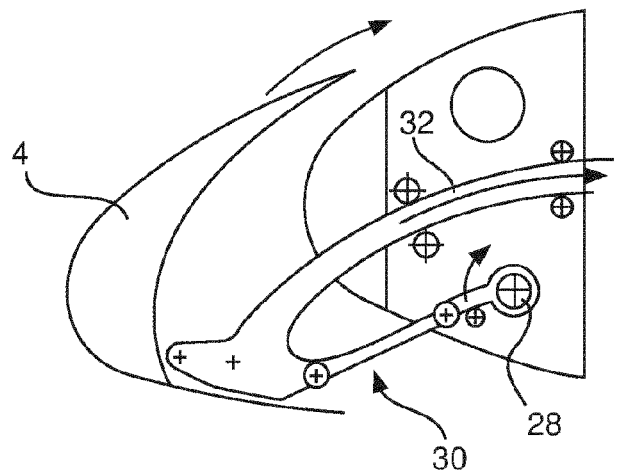

Finally, FIGS. 4A and 4B show two possible different concepts of kinematics for articulating high-lift flaps 4. FIG. 4A shows a driven element in the form of a pinion 24 that is coupled to a curved toothed rack 26 which serves as a guide element. As a result of rotation of the pinion 24 the toothed rack 26 and the high-lift flap 4 arranged thereon is moved. This mechanism is also referred to as a rack and pinion mechanism.

In contrast to the above, FIG. 4B shows a rotary actuator 28 which by way of a rod assembly 30 is coupled to the high-lift flap 4 in order to move the aforesaid along a separate guide 32.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A high-lift system for a wing of an aircraft, comprising:
movably held high-lift flaps;
at least one drive unit;
at least one transmission shaft connected to the drive unit; and
several actuator devices, distributed on the transmission shaft and connected to the high-lift flaps, for moving the high-lift flaps,
wherein the actuator devices each include a driven element and a torque limiting means, and the driven elements of two adjacent actuator devices are interconnected in a non-rotational manner with the use of a separate torque transmitting means directly attached to the driven elements of the adjacent actuator devices of two adjacent flaps.

2. The high-lift system of claim 1,
wherein the torque transmitting means is a torsion shaft.

3. The high-lift system of claim 2,
wherein the torsion shaft is a hollow shaft through which the transmission shaft is fed.

4. The high-lift system of claim 2,
wherein the torsion shaft is connected to a driven element on both ends by means of an offset gear arrangement each, wherein the torsion shaft extends at a distance from and parallel to the transmission shaft.

5. The high-lift system of claim 1,
wherein high-lift flaps of a wing half are divided into two or more groups with different actuating speeds, and actuator devices of adjacent groups comprise different transmission ratios, and the torque transmitting means is arranged only between driven elements that form part of actuator devices of a common group.

6. The high-lift system of claim 5,
wherein between actuator devices that are arranged adjacent to each other and that form part of two different groups of high-lift flaps a torsion shaft at a distance from and parallel to the transmission shaft at both ends of the torsion shaft is connected to the associated driven elements by means of an offset gear arrangement each.

7. The high-lift system of claim 6,
wherein the offset gear arrangements of adjacent groups of high-lift flaps have different transmission ratios for taking into account different actuating speeds.

8. The high-lift system of claim 3,
wherein a junction of the torsion shaft comprises play to compensate for differences in synchronous operation to a driven element at an end of the torsion shaft, which end is opposite the junction.

9. An aircraft, comprising:
a high-lift system for a wing of the aircraft that includes:
movably held high-lift flaps;
at least one drive unit;
at least one transmission shaft connected to the drive unit; and
several actuator devices, distributed on the transmission shaft and connected to the high-lift flaps to move the high-lift flaps,
wherein the actuator devices each include a driven element and a torque limiting means, and the driven elements of two adjacent actuator devices are interconnected in a non-rotational manner with a torsion shaft directly attached to driven elements of the adjacent actuator devices of two adjacent flaps.

10. The aircraft of claim 9, wherein the torsion shaft is a hollow shaft through which the transmission shaft is fed.

11. The aircraft of claim 9, wherein the torsion shaft is connected to a driven element on both ends by means of an offset gear arrangement each, wherein the torsion shaft extends at a distance from and parallel to the transmission shaft.

12. The aircraft of claim 9, wherein high-lift flaps of a wing half are divided into two or more groups with different actuating speeds, and actuator devices of adjacent groups comprise different transmission ratios, and the torsion shaft is arranged only between driven elements that form part of actuator devices of a common group.

13. The aircraft of claim 12, wherein between actuator devices that are arranged adjacent to each other and that form part of two different groups of high-lift flaps the torsion shaft at a distance from and parallel to the transmission shaft at both ends of the torsion shaft is connected to the associated driven elements by means of an offset gear arrangement each.

14. The aircraft of claim 13, wherein the offset gear arrangements of adjacent groups of high-lift flaps have different transmission ratios for taking into account different actuating speeds.

15. The aircraft of claim 10, wherein a junction of the torsion shaft comprises play to compensate for differences in synchronous operation to a driven element at an end of the torsion shaft, which end is opposite the junction.

* * * * *